United States Patent Office 3,101,609
Patented Aug. 27, 1963

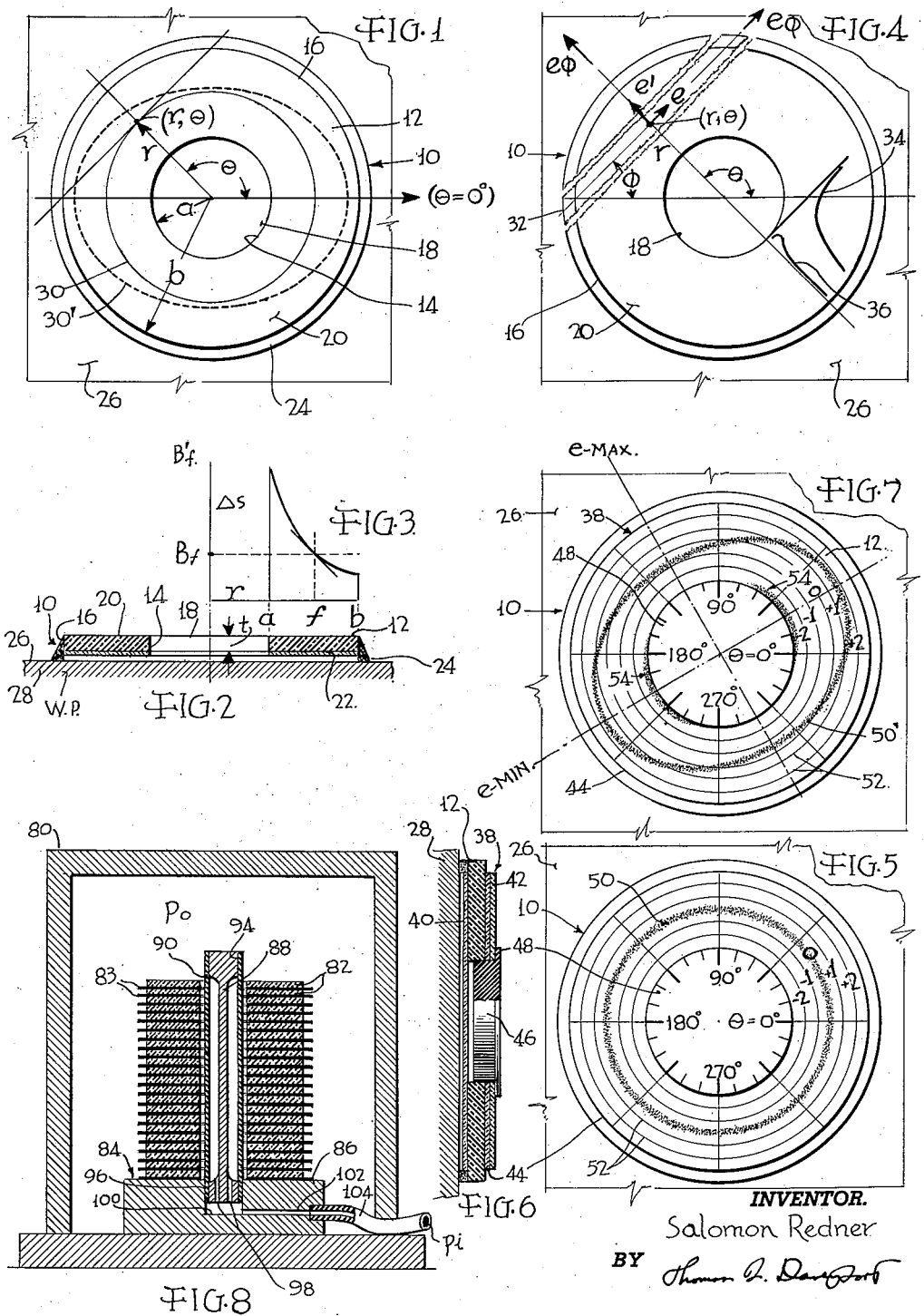

3,101,609
PHOTOELASTIC STRAIN GAUGES
Salomon Redner, Norristown, Pa., assignor to The Budd Company, Philadelphia, Pa., a corporation of Pennsylvania
Filed Oct. 16, 1961, Ser. No. 145,086
3 Claims. (Cl. 73—88)

This invention pertains to improvements in photoelastic strain gauges which are omnidirectional in their resolution of workpiece surface strains and to methods for the manufacture of such gauges.

The basic omnidirectional strain gauge, disclosed and claimed in the copending application of Georges Golubovic, Serial No. 701,592, filed December 9, 1957, now Patent 3,034,341, comprises a photoelastic (forced-birefringent) material testpiece conformed as a flat, circular washer with a concentric circular aperture. When such a testpiece is attached about its periphery to a workpiece surface and observed by means of a simple polariscope, it produces photoelastic patterns which resolve the magnitudes and directions of principal strains at the workpiece surface. The Golubovic gauge is a most significant advance over the prior photoelastic strain gauges which respond to strain differences, or to a unidirectional strain when only that strain is effective, without resolution of the variously directed strains in a general biaxial strain field. However, the photoelastic patterns produced by the Golubovic gauge are somewhat complicated and their interpretation requires training and experience.

Therefore, it is a general object of this invention to provide an improved photoelastic strain gauge yielding simply and easily interpreted photoelastic patterns for the resolution of workpiece surface strains.

A more specific object is to provide an improved photoelastic strain gauge for the resolution of workpiece surface strains by means of photoelastic patterns which are regular polar-coordinate plots of the principal surface strains at the surface of the workpiece, the photoelastic patterns comprising workpiece surface strain related forced-birefringence superimposed upon a regular pattern of bias-birefringence preformed in the photoelastic testpiece of the gauge.

A further specific object of this invention is to provide an efficient, precise, and inexpensive method for producing a regular pattern of bias-birefringence in forced-birefringent material testpieces for use in omnidirectional photoelastic strain gauges.

An illustrated embodiment of the improved strain gauges of this invention comprises a stratum of forced-birefringent material shaped to define a flat circular testpiece with a concentric aperture and means contiguous with the testpiece periphery rigidly attaching the testpiece to the surface of the workpiece, the testpiece having a radially symmetrical pattern of bias-birefringence preformed therein, whereby photoelastic patterns produced by the gauge are polar-coordinate plots of the principal strains at the workpiece surface.

According to this invention, a preferred method for producing apertured testpieces having radially symmetrical patterns of bias-birefringence comprises the steps of forming, from sheet photoelastic material, flat circular testpiece blanks having concentric apertures, thereafter heating the blanks to a given temperature to above the photoelastic critical temperature for the material, subjecting the testpiece blanks while at the given temperatures to an outwardly radially directed pressure applied at the periphery of the apertures, and subsequently cooling the blanks below the critical temperature while maintaining the application of the radially directed pressure, whereby substantially concentric patterns of bias-birefringence are exhibited by the testpiece blanks in the absence of externally imposed strains.

While the articles and methods of this invention are particularly defined in the appended claims, a better understanding thereof will be had upon consideration of the following specification taken in conjunction with the accompanying drawings wherein:

FIG. 1 and FIG. 2 are plan and cross-section views of a strain gauge constructed according to this invention and attached to a workpiece surface;

FIG. 3 is a graph of a pattern of bias-birefringence imposed upon the testpiece of the gauge of FIGS. 1 and 2;

FIG. 4 illustrates stress and strain relationships useful in explanation of the operation of the gauge of FIGS. 1 and 2;

FIG. 5 and FIG. 6 are plan and cross-section views of preferred polariscope in place upon the gauge of FIGS. 1 and 2;

FIG. 7 illustrates photoelastic fringe pattern variations exhibited by the gauges of this invention; and FIG. 8 depicts an example of apparatus for providing patterns of bias-birefringence in strain gauge testpiece blanks according to this invention.

With reference to FIGS. 1 and 2, a photoelastic strain gauge 10 constructed according to this invention comprises a flat washer-shaped testpiece 12 having an inner radius $a$, the radius of aperture 14, and an outer radius $b$. Such a testpiece may be described as having two non-intersecting edges—outer periphery 16, aperture periphery 18. Preferably, testpiece 12 is blanked from forced-birefringent sheet material (Bakelite, or the like) of constant thickness $t$ and having polished surfaces which, undisturbed, become the lateral testpiece surfaces 20 and 22. As does the Golubovic gauge, the omnidirectional strain gauge of this invention includes an outer peripheral attachment means 24, an annular layer of cement for example, contiguous with outer periphery 16 for rigid attachment of testpiece 12 to surface 26 of workpiece 28. According to this invention, however, testpiece 12 contains a preformed radially symmetrical pattern of bias-birefringence which, in the absence of imposed strains, causes the testpiece to generate circular isochromatic interference fringes in normal incidence polarized light. This bias pattern preferably includes at least one boundary fringe position 30 midway between edges 16 and 18.

A photoelastic pattern of isochromatic fringes is directly related to differences between the ordinary and extraordinary indices of refraction of an optically anisotropic material. When refractive index differences are dependent upon externally imposed stresses (or strains) this anisotropy is referred to as forced-birefringence. When such differences exist in a photoelastic material in the absence of external stimuli, the anisotropy is referred to as bias-birefringence. Photoelastic patterns produced by a given photoelastic test-piece are a direct function of total birefringence, the summation of forced-birefringence and bias-birefringence. As total birefringence increases, the color of an associated interference fringe repeatedly varies through the spectral wave lengths. A boundry fringe is the well-defined color band between the blue-greens of one order and the reds of the next order. Fringe production is well understood in the art of photoelasticity and a detailed discussion of the subject may be found in Photoelasticity, by M. M. Frocht, John Wiley and Sons, New York, 1941.

A desired pattern of bias-birefringence may be described by the equivalent stress-difference pattern which, when imposed upon a given forced-birefringent material, would yield a forced-birefringence pattern duplicating that pattern of bias-birefringence. FIG. 3 is a graph of the circularly symmetrical principal stress difference variation with radial position which is descriptive of the preferred testpiece bias-birefringence. Principal stress difference $\Delta s$ varies inversely as the square of the distance $r$ from the axis of symmetry of the testpiece. At radial distance $f$, $\Delta s$ has the value $B_f$ with respect to the testpiece thickness $t$ which yields the boundary fringe locus 30 depicted in FIG. 1. Preferably, the $\Delta s$ curve varies substantially linearly with small radial displacements from $f$ as indicated by the close approximation of the $\Delta s$ curve by its tangent in the vicinity of that radius. Superimposed forced-birefringence at a testpiece region $(r, \theta)$, see FIG. 1, would translate the $s$ curve vertically (positively or negatively) and the intersection of the resultant curve with the $B_f$ abscissa would shift radially, resulting in a concomitant radial displacement of point $f$ and of curve 30. The radial displacement of curve 30 from its original circle to an ellipse 30′, for example, may be considered a polar-coordinate plot of forced-birefringence and of the external condition responsible for the forced-birefringence.

FIG. 4 reproduces testpiece 12 bonded at its periphery 16 to workpiece surface 26 for illustration of the relationship between forced-birefringence and workpiece surface strain conditions, which relationship is common to the basic Golubovic gauge and to the gauges of this invention. Consider the region $(r, \theta)$ at an angular position $\theta$ and radial position $r$. Outer periphery 16 is strained with the workpiece surface 26 and aperture periphery 14 is a free boundary. Since there can be no substantial radial stress through region $(r, \theta)$ perpendicular to the free boundary 14, the tangential strip 32 of incremental width containing the region $(r, \theta)$ acts as a simple photoelastic extensometer parallel with direction $\phi = \theta - 90°$. The extensometer maximum unit strain $e$ will be equal to the parallel workpiece strain $e_\phi$ and the perpendicular extensometer unit strain $e'$ is the Poisson strain related to $e$ by Poisson's ratio $\mu_p$ for the testpiece material: $e' = -\mu_p e$. Forced-birefringence $B_{r,\theta}''$ at the region $(r, \phi)$ is given by:

$$B_{r,\theta}'' = k(e - e') = k(1 + \mu_p)e_\phi \quad (I)$$

where $k$ is a constant for a given testpiece. Equation I is independent of $e_\theta$ and, therefore, the basic gauge may be described as resolving uniaxial strains in a biaxial strain field.

A complication of the basic gauge is diagramed at the right in FIG. 4. Along the diameter through region $(r, \theta)$ the testpiece stress $s_\phi$ in the tangential direction $\phi$ varies with radial position according to curve 34 and there does exist a small radial stress $s_\theta$ varying with radial position according to curve 36. Curves 34 and 36, taken from the theoretical description of an apertured plate in tension, have been found empirically to be qualitatively applicable to the boundary conditions prescribed for testpiece 12. While $s_\theta$ may be neglected at small radial distances from the free boundary, the variations contribute to the kaleidoscope multi-lobed photoelastic patterns of the Golubovic gauge. According to this invention, however, bias-birefringence described in connection with FIG. 3 cooperates with imposed forced-birefringence to produce boundry fringe displacements which are determinative of principal strain magnitudes and directions.

For further explanation of the effect of the bias-birefringence upon the omnidirectional strain gauges, particular reference is directed to FIGS. 5 and 7. Photoelastic patterns are visualized by means of a polariscope system, here comprising polariscope 38, reflector 40, and a light source, ordinary room illumination for example. Polariscope 38 may comprise a laminate of plane polarizing sheet material 42 and a quarter-wave retardation plate 44, attached to a rubber disc 46 which fits within aperture 14 of testpiece 12. Reflector 40 may be a reflective coating applied to the workpiece side of testpiece 12 or its function may be provided for by a reflecting workpiece surface. A paper label 48 may be utilized advantageously to provide angular indicia.

FIG. 5 is a plan view of the assembled polariscope and gauge illustrating, by shading 50, a boundary fringe produced in normal incidence light by the bias-birefringence pattern of FIG. 3. Radial indicia are shown as circles 52 scribed or printed on a surface of polariscope 44. As workpiece 28 is loaded and strains are developed at workpiece surface 26, the boundary fringe will shift concomitantly with those strains from its original position 50 and will assume a quartic form illustrated by an ellipse at 50′ in FIG. 7.

As explained in connection with FIG. 3, forced-birefringence added to the preformed bias-birefringence causes radial changes in the locus of the boundary fringe. However, as explained in connection with FIG. 4, the forced-birefringence at an angular position $\theta$ is proportional to the tangential workpiece strain along the direction $\phi = \theta - 90°$. Therefore, a change in the boundary fringe radius along the direction $\theta$ is a measure of the workpiece surface strain along the direction $\phi$ at right angles to the direction $\theta$.

FIG. 7 illustrates the boundary fringe displacement produced by a workpiece surface strain field in which the maximum strain $e_{max}$ is a tensile strain along the 120° direction and the minimum surface strain $e_{min}$ is a compressive strain along the 30° direction. The directions of the principal surface strains are given by mere inspection. The maximum surface strain is parallel with the minor axis of the boundary fringe ellipse 50′ and the minimum principal surface strain is parallel with the major axis of the boundary fringe ellipse 50′.

Evaluation of a principal or intermediate strain vector magnitude is given by measurement of the boundary fringe shift along the radius perpendicular to that vector. The boundary fringe position 50′ is, therefore, a polar-coordinate plot, rotated by 90°, of the strain vector magnitudes comprising the workpiece surface strain field. Quantities are most conveniently assigned to radial fringe shift increments empirically by subjecting a gauge constructed according to a set of predetermined parameters to known workpiece surface strain fields.

FIG. 7 also illustrates development of a second, higher order, boundary fringe 54. This occurs, with reference to FIG. 3, when there is a sufficient forced-birefringence added to the bias-birefringence to shift the total birefringence curve vertically until it intersects an abscissa $B_f'$ which represents the total birefringence necessary for production of the boundary fringe of the next higher order than that of the residual boundary fringe. Strain magnitude values for the boundary fringe 54 are simply those read from radial indicia 52 plus the value of the difference in the radial separation of the second fringe from the radial position of the first fringe. This difference must, of course, be recorded before the first boundary fringe moves out of the field of view.

The copending application of F. Zandman and S. Reder, Ser. No. 799,798, filed March 16, 1959, and assigned to the same assignee as is this application, discloses and claims the production of certain specialized residual or biasing patterns of birefringence and may be referred to for background information. However, the mechanism of residual bias-birefringence patterns may be explained generally according to a diphase theory of the molecular structure of forced-birefringent plastic materials. These materials owe their characteristics to two sets of molecular bonds. Primary infusible bonds create as a first phase a random structural framework throughout the material and relatively weak secondary bonds constitute a second fusible phase entwined about the first phase network. The second phase fuses or becomes plastic at a moderate temperature, a so-called photoelastic critical temperature. However, the first phase is substantially infusible below the decomposition temperature of the material.

At temperature above the photoelastic critical temperature, the diphase is a composite of fused material encompassing a structural framework of unfused material so that external loading forces selectively induce elastic strains and restoring stresses in the infusible phase. When the temperature is reduced below the photoelastic critical temperature, the fusible phase congeals and thereafter opposes relief of the stresses induced in the infusible phase. Upon subsequent removal of the loading forces an equilibrium condition is established in which residual stresses persist. The residual stress patterns, and hence the residual birefringence patterns, is geometrically similar to the original stress patterns induced by the loading forces.

Preferred materials for the testpieces of this invention include transparent polymerized plastic materials of which Bakelite, a glycerin phthallic anhydride, is an excellent example. Other advantageous materials include resins of the type in which alkyds are copolymerized with styrene. The photoelastic critical temperature for an applicable material may be readily determined empirically upon collection of stress-strain data at a series of temperature conditions. For example, the photoelastic critical temperature of Bakelite is between the approximate limits of 230 and 260° F.

For the purposes of this explanation, a photoelastic critical temperature range is defined as including those temperatures at which a photoelastic plastic acts as a diphase and exhibits a substantially linear stress-strain relationship under load.

Satisfactory methods for the production of regular bias-birefringence patterns in two-edge testpieces, testpieces having two closed and non-intersecting edges, have not been available prior to this invention. The problem has now been solved by means of the simple, inexpensive, and precise means and methods to be described in connection with the apparatus illustrated in FIG. 8.

FIG. 8 is a cross-section elevation showing a constant temperature furnace 80 whose interior may be cycled precisely to temperatures within the photoelastic critical temperature range of a given forced-birefringent material. Testpieces are blanked from a uniform-thickness sheet of forced-birefringent material, preferably a cast sheet, in order to obviate polishing of their lateral surfaces. The testpiece blanks 82 are stacked with interleaved separators 83 on a support assembly 84 which comprises a base 86, a rigid post 88, and a thin-walled expandable tube 90, of a rubber-like material. Annular pressure seals 94 and 96 are provided between post 88 and tube 90 by cementing or other means. Communication with the internal void between post 88 and tube 90 is by way of ports 98 in post 88, and base port 100 and 102, the latter being connected with a pressure tube 104 leading through the wall of furnace 80 to a source, not shown, of controlled air pressure. The pressure $p_o$ applied to the outer peripheries of testpiece blanks 82 may be atmospheric pressure. The generated pressure is adjusted to net a radially directed pressure $p_i$ against the inner peripheries of testpiece blanks 82.

Under these conditions, the internal stress conditions set up in testpiece blanks 82 may be deduced by Lame's solution for thick-walled cylinders (see Resistance of Materials, F. B. Seely, John Wiley and Sons, New York, 1947 edition). When the internal pressure $p_i$ exceeds external pressure $p_o$ the radial stress $s_\theta$ at a radius $r$ measured from the axis of symmetry will be compressive and the tangential stress $s_\phi$ will be tensile according to:

$$s_\theta = -(k/r^2 - h) \quad (II)$$
$$s_\phi = +(k/r^2 + h) \quad (III)$$
$$h = (p_i a^2 - p_o b^2)/(b^2 - a^2) \quad (IV)$$
$$k = (p_i - p_o)(a^2 b^2)/(b^2 - a^2) \quad (V)$$

where $a$ and $b$ are the inner and outer radii of blanks 82. Since $s_\theta$ and $s_\phi$ are principal stresses, the stress difference $\Delta s$ at radius $r$ which is determinative of forced-birefringence, is given by:

$$\Delta s_r = s_\phi - s_\theta = 2k/r^2 \quad (VI)$$

where $k$ is the constant defined in V above.

Forced-birefringence B is directly proportional to stress difference $\Delta s$ and, therefore, may be equated as:

$$B = C/r^2 \quad (VII)$$

where C is a constant equal to the product of $k$ and a multiplier representing the optical strain sensitivity of the material of testpiece blanks 82. Assuming that this pattern of forced-birefringence can be converted into a similar residual or bias pattern, the optimum condition diagramed in FIG. 3 will result.

By means of furnace 80, the testpiece blanks 82 are brought evenly to an elevated temperature above the photoelastic critical temperature of their material, the pressure difference $(p_i - p_o)$ is applied and equilibrium deformation of the blank is allowed to occur. Thereafter, the testpiece blanks 82 are cooled below the critical temperature before reduction of the internal pressure. These process steps have been found to enforce the bias-birefringence pattern predicted by Equation VII upon each of the testpiece blanks 82.

While the above formulae may be employed upon substitution of specific values for the constants, the direct optical presentation of information may be taken advantage of in engineering any given gauge model. For example, a sample testpiece blank was formed from 1/8″ sheet photoelastic plastic material to have inner and outer radii of 1/8″ and 5/8″, respectively. The sample was then viewed by ordinary light transmitted normally through a polarizer and the sample to a reflector and back through the sample and an analyzer to the observer while the blank was heated and subjected to a range of internal pressures. This procedure made visible the formation and position of the boundary fringe pattern and enabled rapid standardization of the method step parameters.

It should be apparent that the improved omnidirectional photoelastic strain gauge of this invention, as applied, is a very direct and uncomplicated exponential amplifier. A circle scribed on a workpiece surface would be deformed as the workpiece was loaded and its deformation would be related to the workpiece surface strains, but such deformations would be too minute in practical cases to yield meaningful information. The deformation of the boundary fringe circle of the gauge of this invention, however, is magnified by the optical strain sensitivity of the photoelastic material so that microscopic workpiece surface strains can be read as millimeter displacements of the boundary fringe position.

Gauge calibration is easily accomplished by applying a range of known loading combinations to a dummy workpiece to which a sample gauge is attached.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of producing a photoelastic testpiece having a radially symmetrical biasing pattern of birefringence, which method comprises the steps of:
    (a) forming from sheet photoelastic material
        a flat circular testpiece blank having a concentric aperture, (b) heating the blank
to a temperature within the photoelastic critical temperature range of the material,
(c) subjecting the blank
to an outwardly radially directed positive pressure applied at the periphery of the aperture,
(d) cooling the blank
below the photoelastic critical temperature range while maintaining application of the radially directed pressure, and
(e) thereafter reducing the pressure
whereby a substantially concentric residual pattern of biasing birefringence is exhibited by the testpiece blank in the absence of external loading.

2. An improved strain sensitive element for omnidirectional photoelastic strain gauges for generating photoelastic patterns resolving vectorial surface strains, which element comprises:
(a) a stratum of photoelastic plastic material shaped to define
a flat circular testpiece with a concentric aperture,
(b) said testpiece having
a radially symmetrical residual pattern of biasing birefringence preformed therein exhibiting
at least one circular boundary fringe when said testpiece is viewed by normal incidence polarized light in the absence of external loading,
(c) said biasing birefringence at each point in said testpiece being
inversely proportional to the distance of that point from the axis of symmetry of said testpiece,
whereby total birefringence patterns produced by said testpiece are polar coordinate plots of externally imposed deformations of the outer periphery of said testpiece.

3. An improved omnidirectional photoelastic strain gauge for the generation of photoelastic patterns resolving vectorial strains at the surface of a workpiece, which gauge comprises:
(a) a stratum of photoelastic plastic material shaped to define
a flat circular testpiece with a concentric aperture, and
(b) attachment means attaching
the outer peripheral edge of said testpiece to the workpiece surface,
(c) said testpiece having
a radially symmetrical residual pattern of biasing birefringence preformed therein exhibiting
at least one circular boundary fringe when said testpiece is viewed by normal incidence polarized light in the absence of external loading,
(d) said biasing birefringence at each point in said testpiece being
inversely proportional to the distance of that point from the axis of symmetry of said testpiece,
whereby the total birefringence produced by said gauge is a polar coordinate plot of vectorial strains acting at the workpiece surface.

References Cited in the file of this patent
UNITED STATES PATENTS

| | | |
|---|---|---|
| 2,332,674 | Smith | Oct. 26, 1943 |
| 3,034,341 | Golubovic | May 15, 1962 |